3,390,108
ETHYLENE GLYCOL-TEREPHTHALIC ACID-
DIMER ACID COPOLYESTER RESIN
Max H. Keck, Cuyahoga Falls, and John R. Wilson, Akron, Ohio, assignors to The Goodyear Tire & Rubber Company, Akron, Ohio, a corporation of Ohio
No Drawing. Filed July 13, 1966, Ser. No. 564,741
13 Claims. (Cl. 260—7.5)

ABSTRACT OF THE DISCLOSURE

The invention relates to new copolyester resins which are copolyesters of ethylene glycol, terephthalic acid and dimer acid and to products of these copolyesters. The copolyesters contain from 99.5 to 95.0 percent of ethylene terephthalate and from 0.5 to 5 percent of ethylene dimerate. The new copolyester resins have an intrinsic viscosity of at least .3 and a reduce melt viscosity and improved affinity for dyes (fibers) compared to the conventional high molecular weight polyethylene terephthalate polyester resins. The new copolyester resins have utility as films, fibers and textile staple fiber blends.

---

This invention relates to new copolyester resins, to improved polyester filaments, films and other products produced therefrom.

Synthetic filaments of aromatic polyester resins such as polyethylene terephthalate are composed of relatively large linear molecules. In order for such filaments to have adequate yarn properties the resins from which they are made must be of high molecular weight. It has been found in general that the higher the molecular weight of the resin from which the filament is prepared the better the physical properties that can be induced in the filaments. A practical limit on the molecular weight of the polymer is determined by the melt viscosity of the polymer at spinning temperatures. Thus, if the melt viscosity of the polymer is too high, considerable difficulty is experienced in spinning fibers. In the case of industrial fibers it is desirable to have molecular weights of the resins as high as is practical in view of the uses of the fibers and the processing characteristics of the resin in spinning operation.

High molecular weight polyethylene terephthalate is a polymer that can be formed into fibers having high tenacity and other properties that permit their use as industrial fibers, but the resin at the high molecular weight required to produce such fibers is extremely viscous in molten state. For superior industrial fibers it is necessary that molecular weight of the resin be as high as the practical processing limitations will allow.

According to the invention a new copolyester has been discovered. These copolyesters are copolymers of ethylene glycol-terephthalic acid and dimer acid in which the dimer acid units comprise from 0.5 to 5 percent of the acid units in the copolyester. For convenience these copolyesters are named herein ethylene terephthalate-ethylene dimerate copolyesters.

These new copolyesters have reduced melt viscosity as compared with polyethylene terephthalate and fibers of these resins have been unexpectedly found to have much greater affinity for disperse dyes than do fibers of polyethylene terephthalate. This latter property is of considerable interest because filaments of aromatic polyester resins such as polyethylene terephthalate are highly oriented crystalline structures that are more difficult to dye than are filaments or yarns made from natural fibers or regenerated cellulose or protein fibers. The oriented crystalline structure of the aromatic polyester fibers is not easily penetrated by water or by molecules of dyestuffs during conventional dyeing procedures.

Fabrics made from polyethylene terephthalate fibers can be dyed by dispersed dyestuffs at elevated temperatures in the range of from 120 to 130° C. at superatmospheric pressure or by employing a carrier to swell the fibers to allow penetration of the disperse dyes. These temperatures are too high for certain natural fibers and fabrics of mixtures of polyester fiber with natural fibers may be damaged by such temperatures. The use of carriers is undesirable because they are difficult to remove from the fibers and may plasticize or soften polyester fibers and make them less serviceable. Furthermore, carriers swell the fibers and make them less resistant to the effects of dry cleaning solvents. In addition, the use of a carrier adds to the cost of dyeing the fibers because fibers dyed with the assistance of a carrier must be subjected to an additional treatment to remove absorbed carrier. It is desirable, therefore, for polyester fiber, particularly one intended for blending with other fibers, to be dyeable at temperatures of about 100° C. or below without the use of a carrier.

It is an object of the invention to provide new copolyester resins suitable for spinning into fibers which can be dyed with disperse dyestuffs. It is another object of the invention to provide improved polyester fibers that can be dyed without using a carrier to assist the dyeing. It is another object to provide new copolyester resins that have reduced melt viscosity. It is another object to provide copolyester resins suitable for the manufacture of high tenacity fibers. Still another object of the invention is to provide a process for making the copolyester resins. Other objects will appear hereinafter as the description of the invention proceeds.

According to the invention a new type of copolyester has been discovered. These new copolyesters possess the most desirable properties of polyethylene terephthalate homopolymer and also have greatly improved dye affinity and a reduced melt viscosity. These copolyesters can be obtained by reacting together ethylene glycol, terephthalic acid and dimer acid or by reacting ethylene glycol with ester forming derivatives of terephthalic acid such as the lower alkyl esters and other recognized varieties and then with dimer acid. The dimer acid used in the invention is prepared by dimerizing an unsaturated fatty acid containing 18 carbon atoms such as linoleic or linolenic acid or a monohydric alcohol ester thereof. The preparation and structure of the dimerized fatty acid is described in J.A.C.S. 66, 84 (1944) and in U.S. Patent 2,347,562. Several different grades of such dimerized fatty acids are available from commercial sources and these acids vary in iodine value and monomer and trimer content. It is preferred that the dimer acid used be substantially freed of monomer and trimer fractions by molecular distillation or other suitable means. The dimer acid used is preferably reduced to saturate all of the carbon to carbon double bonds in the dimerized acid, although the unsaturated acid can be used if desired. The mol ratio of terephthalic acid radicals to dimer acid radicals in the copolymers formed can be from 99.5:0.5 to 95:5. Thus the copolyesters can contain ethylene terephthalate units in the amount of from 99.5 to 95% of the sum of ethylene terephthalate units and the ethylene dimerate units in the copolyester, and correspondingly from 0.5 to 5 percent of said sum of ethylene dimerate units. (The term dimerate is used to indicate the ester of dimer acid.)

In a preferred method of preparing the copolymers of the invention dimethyl terephthalate and ethylene glycol are reacted at 140 to 205° C. in the presence of catalyst at atmospheric pressure and the methanol liberated is distilled off. Various catalysts can be used for this ester interchange reaction. Suitable catalysts are catalysts such as zinc acetate, lead acetate, manganese acetate, lead acetate and litharge. The desired quantity of dimer acid is then added and heating is continued at 200° to 220° C. to distill off the water formed as a result of the reaction of the dimer acid. While it is not essential that a catalyst be added to the reaction mixture in the esterification reaction, it will be obvious to those skilled in this art that certain esterification catalysts can be used to promote the esterification reaction. Representative examples of such catalysts include soluble metal glycolates, alkoxides and salts of weak acids, tertiary amines and amphoteric metals. When the theoretical amount of water has distilled, vacuum is gradually applied until a pressure of one millimeter of mercury is reached. Simultaneously the reaction temperature is gradually raised from about 220° to 275° C. Glycol released in the condensation is distilled out. When the desired melt viscosity is attained the copolymer melt is discharged from the reactor.

Various catalysts can be used for the condensation reaction. Representative examples of suitable catalysts are antimony trioxide, litharge, glycol soluble compounds of titanium and glycol soluble compounds of cobalt.

In order to have good physical properties in the products it is necessary that the copolyesters have a high molecular weight, i.e., an intrinsic viscosity of at least 0.3 and preferably at least 0.5. Melt spinning of these new copolyester resins produces polyester filaments which have much improved dyeing properties. They can be dyed with dispersed dyestuffs without using a carrier to assist the dyeing. Various disperse dyes can be used. Representative examples of such dyes are Duranol Blue G, Dispersol Scarlet T, Dispersol F, Orange B and Duranol Br Yellow Tr.

The following examples are set forth to illustrate the invention. In these examples parts and percentages are by weight unless otherwise indicated.

Example 1

A three liter three-neck flask fitted with a stirrer, a thermometer and distillation accessories was charged with 1105 grams of dimethyl terephthalate, 930 grams of ethylene glycol, 0.35 gram of manganese diacetate and 0.35 gram antimony trioxide. The mixture was heated with stirring until the evolution of methyl alcohol was complete. 171.6 grams of dimer acid were then added and the temperature was raised from 207 to 217° C. to distill off the water formed by the reaction of the dimer acid. A portion of the product was transferred in molten state to a one liter autoclave. Temperature and vacuum were slowly increased so that after one hour and 25 minutes a temperature of 280° C. and a pressure of 1.9 millimeters of mercury pressure were obtained. After an additional one-half hour under these conditions the polymer was discharged from the reactor. It had an intrinsic viscosity of 0.674. The polymer was ground and dried. It was then spun into yarn by conventional melt spinning process at 293° C. and oriented by stretching four times its original length. A sample of the yarn was dyed with Dispersol Scarlet disperse dye without carrier at 80° C. for one hour. This yarn dyed to a somewhat darker shade than a yarn of ethylene terephthalate homopolymer which had been dyed with the assistance of a carrier. The following procedure was used for dyeing the yarn. The material was scoured in a bath comprising 1 part Lissapol 500 (nonionic surfactant sold by ICI Organics Inc.), 1 part soda ash and 1000 parts water for 0.5 hour at 70–100° C., then washed with cold water containing 1 percent acetic acid, and placed in a beaker containing a dye bath heated to 40° C. and comprising the following mixture:

Liquor: goods _____ 20:1
Water _____ml__ 400
Daxad 11KLS (dispersing agent sold by W. R. Grace
  & Company) _____percent__ 0.1
Lissapol 500 _____percent__ 0.1
Disperse dye (Duranol Blue G) _____g__ 0.7

The dye bath was heated by means of an electric hot plate to boiling in 0.5 hour and held at boiling for 1.0 hour. The material was removed from the bath and rinsed with cold water. Loose dye was removed by placing yarn in a bath maintained at a temperature of 25° C. which comprised:

Water _____ml__ 250
NaOH (30%) _____ml__ 1.5
Sodium hydrosulfate _____g__ 0.5
Lissolamine A (ICI Organics Inc.) _____g__ 0.5

The temperature of the bath was raised to 50° C. and held at this temperature for 0.5 hour. The material was then rinsed in cold water, scoured for 0.5 hour in water containing 0.1 percent Lissapol 500 at 70–80° C. and again rinsed with cold water.

Example 2

The 97.5/2.5 ethylene terephthalate-ethylene dimerate copolyester resin was prepared. The polymer was spun into yarn and dyed as in Example 1 with several dispersed dyes. Dyeability was equal to or better than that of a polyethylene terephthalate homopolymer control dyed with a carrier. Scouring tests on the yarn indicated only minor bleeding of the dye. Tests on the fiber for tenacity, thermal stability, hydrolytic stability and dye extraction all indicated that the copolyester fiber was equal to or better than a control of polyethylene terephthalate homopolymer.

Example 3

A 95/5 ethylene terephthalate-ethylene dimerate copolyester was prepared. The polymer was spun into yarn and dyed according to the procedure used in Example 1. Dyeability was better than that of a polyethylene terephthalate homopolymer dyed with a carrier.

Data on the properties of the copolyester fibers are tabulated in Tables I and II. The data on polyethylene terephthalate homopolymer and 90/10 ethylene terephthalate-ethylene isophthalate copolyester fibers are included to provide a standard for comparison.

TABLE I

|  | ET/ED | | | | ET/I | |
| --- | --- | --- | --- | --- | --- | --- |
|  | 95/5 | 97.5/2.5 | 98.25/1.75 | 99/1 | 100/0* | 90/10 |
| Polymer IV | 0.72 | 0.70 | 0.75 | 0.70 | 0.62 | 0.62 |
| Spin Temp., ° F | 560 | 560 | 560 | 560 | 560 | 560 |
| Yarn IV | 0.72 | 0.69 | 0.73 | 0.70 | 0.59 | _____ |
| Draw Ratio | 4X | 4X | 4X | 4X | 4.5X | 4.2X |
| Drawn Denier and Count | 74/35 | 74/35 | 88/35 | 74/35 | 84/35 | 74/35 |
| Tenacity, g./d | 5.1 | 5.3 | 5.6 | 5.8 | 4.4 | 4.9 |
| Elongation at Break, percent | 18 | 18 | 25 | 21 | 27 | 19 |
| Shrinkage (100° C. H₂O) percent | <5 | <5 | 6.5 | <5 | <5 | <10 |

*Resins delustered with 0.35% TiO².
IV=Intrinsic Viscosity.

TABLE II

| Composition | 99/1 ET/ED | 97.5/2.5 ET/ED | 95/5 ET/ED | 100/0 ET |
|---|---|---|---|---|
| Hydrolytic Degradation, percent Broken Bonds | 0.08 | 0.08 | 0.09 | 0.09 |
| Thermal Degradation, percent Broken Bonds | <0.02 | <0.02 | <0.02 | 0.03 |
| Carboxyl Content, eq./10$^6$ g | 15 | 11 | 11 | 19 |
| Melting Point, °C. DTA | 255 | 252 | 250 | 257 |
| Intrinsic Viscosity | 0.707 | 0.705 | 0.718 | 0.677 |

DTA = Differential Thermal Analysis.

The percent of broken bonds on exposure to heat or thermal stability of each of the resins in the table was determined as follows:

About 10 grams of thoroughly dried polymer were heated in nitrogen atmosphere for two hours in a test tube inserted in an aluminum block maintained at 280° C. The intrinsic viscosity of the original polyester resin and of each of the thus treated samples of polyester resin was determined in a 60/40 phenol-tetrachloroethane mixed solvent at 30.0° C. The percent of broken linkages was calculated for each sample of resin using the following formula:

$$\text{Percent of broken linkages} = \frac{IV_{in} - IV_{degraded}}{IV_{in} \times IV_{degraded}} \times C \times 100$$

in which $IV_{in}$ = intrinsic viscosity of the polymer before thermal degradation.

$IV_{degraded}$ = intrinsic viscosity after thermal treatment.

$C$ = a factor which depends on the viscosity range of the sample.

The following average values of C were used in these calculations—

| IV Range: | Conversion Factor C |
|---|---|
| 0.75–0.65 | 0.396 |
| 0.70–0.60 | 0.401 |
| 0.65–0.55 | 0.409 |
| 0.60–0.50 | 0.417 |
| 0.55–0.45 | 0.422 |
| 0.50–0.40 | 0.435 |

The percent of broken bonds on exposure to steam (or hydrolytic stability) of each of the resins was determined as follows:

A portion of the polymer sample was cut into particles having a diameter of about two millimeters. About one gram of these particles was heated at 140° C. under one millimeter of mercury pressure for 16 hours.

The polymer was then transferred to a 400 milliliter stainless steel beaker containing 20 milliliters of distilled water. The beaker was placed in a steam sterilizer and heated at 120° C. for six hours. The polymer was recovered from the water by filtration, rinsed with acetone, and dried for three hours at 60° C. at atmospheric pressure and then for 16 hours at 140° C. and one millimeter vacuum. The intrinsic viscosity of the thus treated polymer was determined in a 60/40 phenol-tetrachloroethane mixed solvent at 30.0° C. The percent of broken linkages due to the hydrolysis treatment was calculated for each sample of resin using the following formula:

$$\text{Percent of broken linkages} = \frac{IV_{in} - IV_{hydro}}{IV_{in} - IV_{hydro}} \times C \times 100$$

in which $IV_{in}$ is the intrinsic viscosity of the original polymer and $IV_{hydro}$ is the intrinsic viscosity of the hydrolyzed polymer.

The free carboxyl content of the copolyesters was determined using the procedure described in Analytical Chemistry, vol. 26, pages 1614–1616 (1954) by Herbert Pohl.

Intrinsic viscosity as recorded for the resins is defined as limit $$\frac{\ln(\eta_r)}{C}$$

as C approaches 0 in which $\eta_r$ is the viscosity of a dilute solution of the resin in a 60/40 phenol-tetrachloroethane solvent mixture divided by the viscosity of the solvent mixture in the same units at the same temperature. For the intrinsic viscosities reported in this specification a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscosimeter at 30.0° C. and these times were used in the respective viscosities in the equation above.

Two samples of yarn of a 97.5/2.5 ethylene terphthalate-ethylene dimerate copolyester of the invention were knitted into a sock fabric and dyed according to the above procedure. The dyed copolyester sock material was compared with dyed polyethylene terephthalate sock material in laundering, drycleaning and staining tests. The results of the tests are listed in Table III below.

TABLE III

| Sample | Polymer | Dye Particulars Knit Goods | Dry Clean. | Laundering, 105° F. (1 hr.) | | Crocking | | Sublimation | Perspiration | |
|---|---|---|---|---|---|---|---|---|---|---|
| | | | | Alt. in Shade | Staining | Dry | Wet | | Alt. in Shade | Staining |
| A | 97.5/2.5 Ethylene Terephthalate-Ethylene Dimerate. | 3.5% Duranol Blue G. No carrier, 1½ hrs. at 97° C. | 4 | 4 | 4 | 4 | 4 | 5 | 4 | 4 |
| B | Polyethylene Terephthalate | 3.5% Duranol Blue with carrier, 1½ hrs. at 98° C. | 4 | 4 | 4 | 4 | 4 | 5 | 4 | 4 |
| C | 97.5/2.5 Ethylene Terephthalate-Ethylene Dimerate. | 3.5% Latyl Blue Rln. No carrier, 1½ hrs. at 97° C. | 4 | 4 | 4 | 4 | 4 | 5 | 4 | 4 |
| D | Polyethylene Terephthalate | 3.5% Latyl Blue Rln with carrier, 1½ hrs. at 98° C. | 4 | 4 | 4 | 4 | 4 | 5 | 4 | 4 |

In the above table the numerical ratings have the following meanings.—5=Excellent; 4=Good; 3=Fair; 2=Poor; 1=Very Poor.

The melt viscosities of polyethylene terephthalate homopolymer and a 97.5/2.5 copolyester were determined at 290° C. The intrinsic viscosities of these polymers as determined in a 60/40 phenol-tetrachloroethane solution at 30.0° C. were 0.62 and 0.70 respectively. The data obtained are tabulated in Table IV below.

TABLE IV

| Composition | Melt Viscosity, Poises | Intrinsic Viscosity |
|---|---|---|
| 100/0 | 2,900 | 0.62 |
| 97.5/2.5 | 2,900 | 0.70 |

These data show that the copolyesters have a higher intrinsic viscosity than polyethylene terephthalate homopolymer for a given melt viscosity. Lower melt viscosity makes the polymer easier to stir and thus aids in carrying out the polymerization reaction. Generally high molecular weight polymers having lower melt viscosity undergo less degradation when they are formed into products by melt extrusion operations.

The copolyesters of this invention are valuable film forming materials and films can be made from the copolyesters by melt extrusion or other suitable methods. Orientation or stretching improves properties of the films. Films and foils of the polyesters have good clarity and a brilliant luster. They are characterized by high tensile strength and low elongation, good age life and excellent electrical properties. They are particularly useful in packaging applications, magnetic tapes, electrical insulation and other applications where high strength clear films are utilized. Films of the copolyesters can be prepared in amorphous state by super cooling hot amorphous film before crystallization occurs. Such films can be readily oriented by warming and then stretching. Where biaxial orientation is desired the films are stretched in two directions at right angles to each other.

For some uses it is desirable to stretch the film in only one direction, as for example in the preparation of tapes for industrial uses. Stretching in one direction is readily accomplished by such methods as winding a film from one roll to another, the second roll rotating at a higher peripheral speed than the first roll. This stretching operation can be accomplished by methods familiar to those skilled in the art and is facilitated by warming the film by some suitable means just prior to the actual stretching of the film.

Fibers made from resins of the invention can be prepared by melt extrusion and by spinning from solution in a suitable solvent. Such fibers can be oriented and are usually oriented by cold drawing. If desired, the fibers can be heat set by heating them at elevated temperature while maintaining them under tension according to known practices. The oriented heat set fibers of the invention have the improved dyeing properties, high tenacity, low elongation and other desirable properties. They are particularly useful in textile applications including staple fiber blends containing about 25 to 65 percent by weight of copolyester staple fiber and 75 to 35 percent by weight of another staple fiber. Blends of low shrinkage fibers can be used in manufacturing apparel such as men's and ladies' suits, sportswear, underwear, sport shirts, sweaters and dresses. Other uses will be in the manufacture of slip covers, sheets, mattress coverings and upholstery. The low shrink staple to be mixed with the copolyesters of this invention may be such as cotton, silk, rayon, linen, wool, acrylic polymers and copolymers, nylon and polyester fibers such as polyethylene terephthalate and poly 1,4 cyclohexylene dimethylene terephthalate. Preferred blends are from 25 to 65 percent by weight of a 97.5/2.5 ethylene terephthalate-ethylene dimerate copolyester with from 75 to 35 percent by weight of cotton and 25 to 65 percent by weight of a 97.5/2.5 ethylene terephthalate-ethylene dimerate copolyester with from 75 to 35 percent by weight of wool.

Blends of the low shrinkage fibers with fibers having high shrinkage characteristics are useful in making bulkable and bulky yarns, texturized fabrics and rugs. Suitable high shrink fibers are shrinkable polyethylene terephthalate, shrinkable nylon and shrinkable copolyesters of ethylene terephthalate with a modifying monomer.

Blends of the copolyester fibers with fibers having elastic properties are useful in stretch fabrics, sportswear, socks and in other applications where stretchable materials are required. Blends with elastic polyester fibers and with elastic polyurethane fibers such as Lycra are useful in stretch applications.

Fibers of the copolyesters can also be made having high shrinkage properties by orienting them without subsequent heat setting. Such fibers can be made to shrink 30 percent or more by subsequent heat treatment under no tension as by treating the fibers with boiling water. High shrink fibers are particularly useful in blends with other fibers that have different shrink characteristics, particularly with fibers having low shrink characteristics.

The blends can be blends of continuous filaments of copolyesters of this invention with continuous filaments of other materials or the blends can be blends of staple fibers. Such blends are useful for making bulkable composite yarns, bulky yarns, crimped fibers and fabrics. Blends of fibers having differential shrink characteristics are particularly useful in permanently creased garments, heat insulation fabrics, texturized fabrics and rugs.

While the copolyesters will generally be used without further compounding they can be compounded with other materials if desired. Compatible resins, elastomers, pigments, flatting agents, dyes, plasticizers and other compounding ingredients can be added either by mixing the materials together on a suitable mill or other mixing apparatus, or by mixing in such compounding ingredients in solutions of the polyesters in a solvent.

While certain representative embodiments and details have been shown for the purpose of illustrating the invention it will be apparent to those skilled in the art that various changes and modifications may be made therein without departing from the spirit or scope of the invention.

What we claim is:

1. A copolyester of ethylene glycol, terephthalic acid and dimer acid in which the dimer acid is a dimer of a $C_{18}$ acid substantially free of trimer and in which the ethylene terephthalate units comprise from 99.5 to 95 percent of the sum of the ethylene terephthalate and ethylene dimerate units in the copolyester and the ethylene dimerate units comprise from 0.5 to 5 percent of said sum, said copolyester having an intrinsic viscosity of at least 0.3.

2. A copolyester according to claim 1 in which the dimer acid is selected from dimer acid and hydrogenated dimer acid.

3. A copolyester of ethylene glycol, terephthalic acid and hydrogenated dimer acid in which the hydrogenated dimer acid is a hydrogenated dimer of a $C_{18}$ acid substantially free of trimer and in which the ethylene terephthalate units comprise from 99.5 to 95 percent of the sum of the ethylene terephthalate and ethylene dimerate units in the copolyester and the ethylene dimerate units comprise from 0.5 to 5 percent of said sum, said copolyester having an intrinsic viscosity of at least 0.3.

4. A copolyester of ethylene glycol, terephthalic acid and hydrogenated dimer acid in which the hydrogenated dimer acid is a hydrogenated dimer of a $C_{18}$ acid substantially free of trimer and in which the ethylene terephthalate units comprise from 99.5 to 97.0 percent of the sum of the ethylene terephthalate and ethylene dimerate units in the copolyester and the ethylene dimerate units comprise from 0.5 to 3.0 percent of said sum, said copolyester having an intrinsic viscosity of at least 0.3.

5. A copolyester of ethylene glycol, terephthalic acid and hydrogenated dimer acid in which the hydrogenated dimer acid is a hydrogenated dimer of a $C_{18}$ acid substantially free of trimer and in which the ethylene terephthalate units comprise 97.5 percent of the ethylene terephthalate and ethylene dimerate units in the copolyester and the ethylene dimerate units comprise 2.5 percent of said sum, said copolyester having an intrinsic viscosity of at least 0.3.

6. A copolyester according to claim 4 in the form of an oriented fiber.

7. A copolyester according to claim 1 in the form of a film.

8. A copolyester according to claim 1 in the form of an oriented fiber.

9. A copolyester according to claim 1 in the form of a heat shrinkable fiber.

10. A copolyester according to claim 1 in which the ethylene terephthalate units comprise from 99.5 to 97.0 percent of the sum of the ethylene terephthalate and ethylene dimerate units in the copolyester and the ethylene dimerate units comprise from 0.5 to 3.0 percent of said sum.

11. An ethylene terephthalate-ethylene dimerate copolyester of ethylene glycol, terephthalic acid and dimer acid in which the dimer acid is a dimer of a $C_{18}$ acid substantially free of trimer and in which the ethylene terephthalate units comprise 97.5 percent of the sum of the ethylene terephthalate and ethylene dimerate units in the copolyester and the ethylene dimerate units comprise 2.5 percent of said sum said copolyester having an intrinsic viscosity of at least 0.3.

12. A blend of from 25 to 65 percent by weight of a fiber of the copolyester of claim 1 and from 75 to 35 percent by weight of a natural fiber selected from the group consisting of cotton and wool.

13. The method of preparing a polyester fiber having improved affinity for disperse dyes which comprises reacting at a temperature of about 200° C. to about 280° C. bis hydroxyethyl terephthalate and from 0.5 to 5 mol percent, based on the total mols of acid component present, of a dimer acid which is a dimer of $C_{18}$ acid substantially free of trimer and which is an acid selected from dimer acid and hydrogenated dimer acid, condensing the product to form a polymeric polyester having an intrinsic viscosity of at least 0.40, shaping the resin in the form of a fiber and cold drawing the fiber.

References Cited

UNITED STATES PATENTS

| | | | |
|---|---|---|---|
| 3,311,578 | 3/1967 | Laakso. | |
| 1,803,174 | 4/1931 | Dawson | 260—22 |
| 2,208,305 | 7/1940 | Kittredge | 260—22 |
| 3,025,266 | 3/1962 | Huffman | 260—75 |
| 3,053,810 | 9/1962 | Griehl et al. | 260—75 |
| 3,057,824 | 10/1962 | Le Bras et al. | 260—75 |
| 3,158,584 | 11/1964 | Layman | 260—75 |

OTHER REFERENCES

Cowan et al.: Journal Amer. Chem. Soc., January 1944, pp. 84–88, vol. 66.

WILLIAM H. SHORT, *Primary Examiner.*

E. M. WOODBERRY, *Assistant Examiner.*